Oct. 9, 1923.
A. F. MONEUSE
WATER HEATER
1,469,803
Original Filed Nov. 12, 1918  2 Sheets-Sheet 2
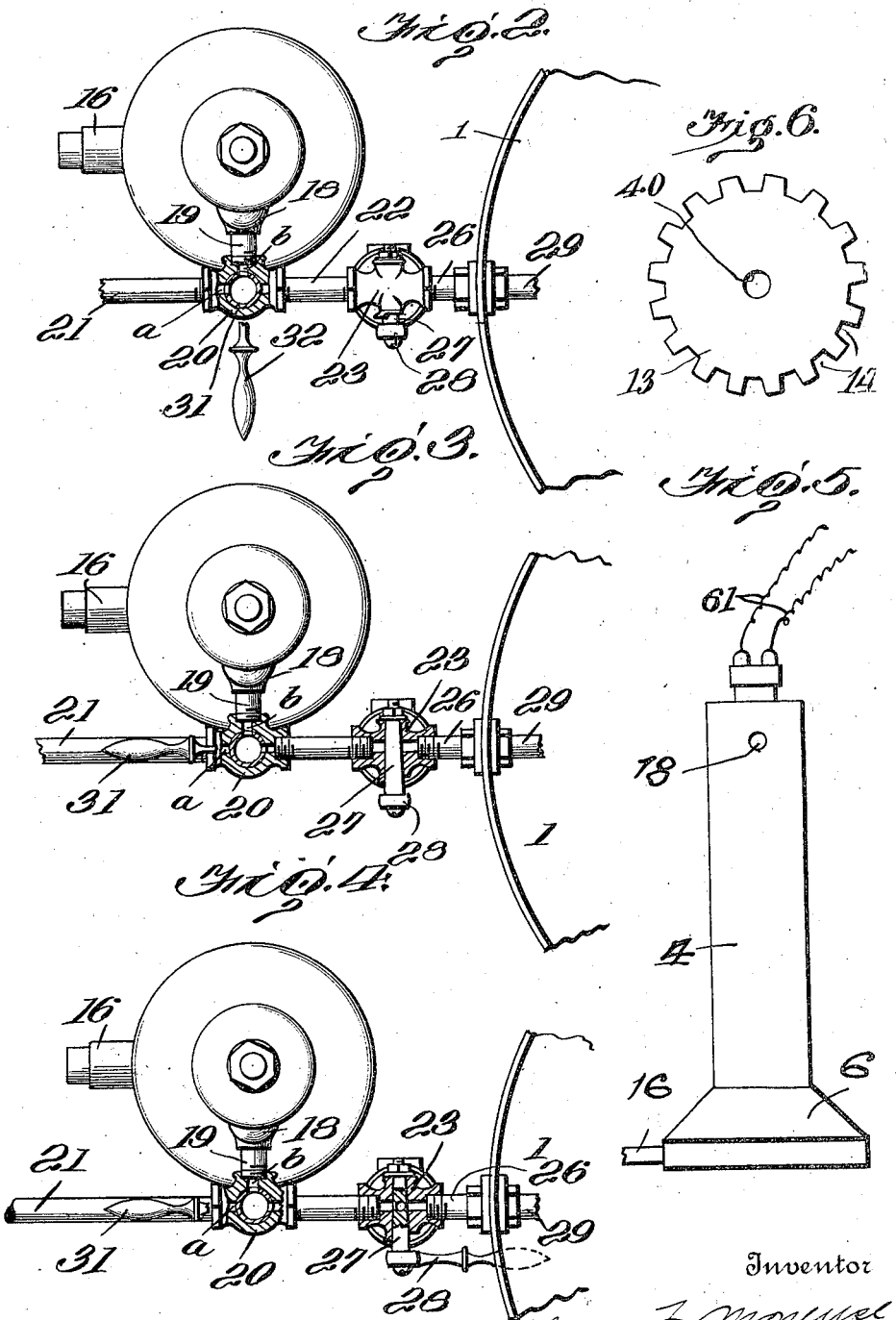
Inventor
Alphonse F. Moneuse
By
Attorney Patented Oct. 9, 1923.

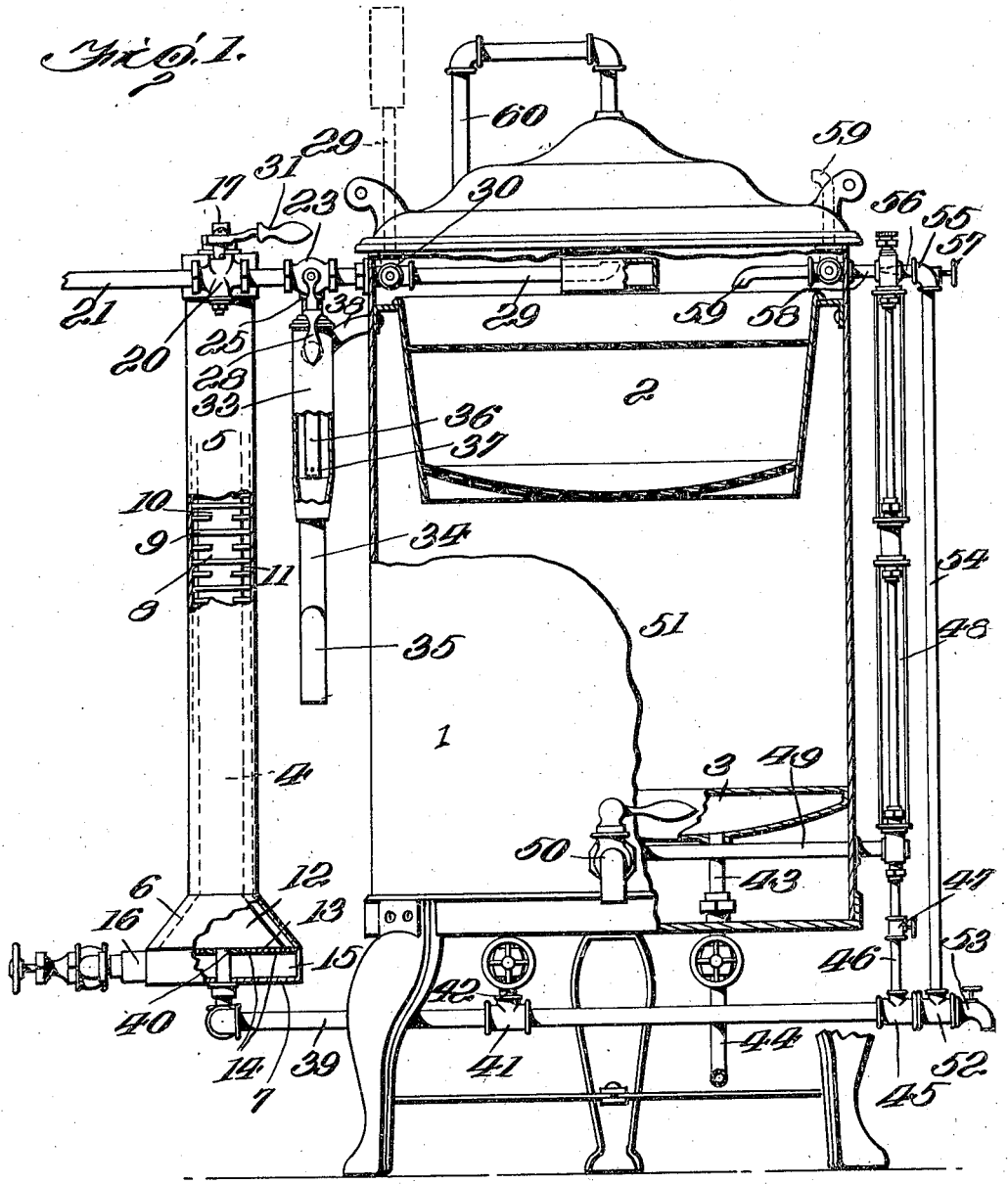

1,469,803

UNITED STATES PATENT OFFICE.

ALPHONSE F. MONEUSE, OF NEW ROCHELLE, NEW YORK.

WATER HEATER.

Application filed November 12, 1918, Serial No. 262,184. Renewed April 2, 1921. Serial No. 458,089.

*To all whom it may concern:*

Be it known that I, ALPHONSE F. MONEUSE, a citizen of the United States, residing at New Rochelle, in the county of Westchester and State of New York, have invented certain new and useful Improvements in Water Heaters, of which the following is a specification.

This invention relates to improvements in hot water heaters for use in connection with coffee urns and other purposes.

The primary object of the invention is to improve upon the heater shown and described in my Patent Number 928,063, dated July 13, 1909, with particular regard to the manner of introducing the water into the heater, and also to improve upon the features relating to water and steam circulation.

In the drawings I have illustrated a single urn, and a single hot water heater and separator, but it will be understood, and will appear from the following description, that the improvements may be applied to a series of urns, and heaters, depending upon considerations of capacity of the outfit.

In the drawings illustrating the invention,

Figure 1 is an elevation of the urn and the heater, partly broken away, and partly in section;

Figure 2 is top plan view of the heater showing its relative position to the urn, and a valve in section, the position of which being to direct the hot water to a point distant from the urn shown, or to another urn that may be located beside the one shown;

Figure 3 is a similar view showing the heater in plan, and the heater valve and water separator valve in section, the position of the valve being such as to establish communication between the heater and the urn;

Figure 4 is a view like Figure 3, the heater and water separator valves being in section, but the positions of the valves being such that communication is established between the heater and the water separator and cut off between the separator and the urn, or in the position wherein it is desired to draw hot water outside of the urn between the heater and the urn.

Figure 5 is a side elevation of the water heater, detached, showing a modified form in which the heating element consists of an electric coil within the pipe.

Figure 6 is a plan view of the disk employed in the bottom of the heater.

Referring to the drawings, the numeral 1 designates the urn, 2 the ordinary strainer or percolator positioned in the upper part thereof, and 3 the hollow false bottom into which, as will appear more particularly later, steam is introduced to keep the contents of the urn heated and ready for use.

The numeral 4 designates the water heater. This comprises in the main, a cylinder 5, having an enlarged conical lower end 6, capped or closed at its lower end by plate 7. Within this cylinder is the steam tube 8, surrounded by a series of ribs 9, in broken or interrupted arrangement, that is to say, the ribs are so arranged between the wall of the cylinder 5 and the periphery of the steam tube 8, that openings 10 are left so that the water in passing through the water space 11, must pass virtually around the steam tube, before it can pass upwardly through the openings 10 to the top of the tube, thus insuring a complete and uniform circulation of the water around the tube. In this particular, the present construction is like the construction shown in my patent hereinbefore referred to, but unlike the arrangement shown in the patent, I provide at the bottom of the cylinder, the conical lower end 6, and the steam tube is provided also with a conical lower end 12, closed by a disk 13 having a serrated periphery 14, the openings formed by the serrations lying outside of the end 12, so that water, passing into the chamber 15, at the bottom of the heater, will only be able to enter the upper part of the heater, by passing through the serrations, over the surface of the conical end 12 of the steam tube, thus presenting a comparatively thin film of water for distribution through the upper part of the heater, and preventing the water from rushing directly to and through the space between the outer wall of the heater and the periphery of the steam tube. Water is introduced into the chamber 15, through the valved water inlet 16, which obviously may lead to any convenient source of water supply.

Steam is introduced to the steam tube through steam inlet 17, which also may lead to any suitable source of steam supply.

The numeral 18 designates a water outlet into which is tapped a short pipe 19, threaded into a two-way valve or cock 20, there being connected with the valve a pipe 21, through which, according to the position of the valve, hot water from the heater may be directed in a direction away from the urn. Connected with this valve is another short pipe 22, connected with a three-way valve 23, which connects with the water separator 24, by a short connection 25, and this water valve is connected to the urn by suitable connections 26, the arrangement of this valve being such that its core 27 may be turned by a suitable handle 28, to establish communication directly between the heater and the urn; or by another position of the valve. Communication between the water separator and the urn may be cut off and the hot water from the heater may be caused to flow through the separator, according to the requirements of the situation. Connected with the pipe 26 is a pipe 29, which preferably is provided with a pivot joint 30, whereby the pipe 29 may be rocked to the position shown in dotted lines, Figure 1, so as to be out of the way of the strainer or percolator, when it is desired to lift the strainer out of the urn.

Reverting to the two-way valve 20, the numeral 31 designates a hollow valve core provided with two ports $a$ and $b$ and to the core is connected a suitable handle 32, by which the core may be turned to bring the ports into registry with the pipes 18 and 21, to establish communication between the heater and a point remote from the urn, or, as shown, in Figure 3, to establish communication between the heater and the water separator or the urn, according to the position of the valve core 27 in the intermediate valve 23. As shown in Figure 3, the core of the valve 28 is so positioned as to establish communication between the water heater directly with the urn, the valve 20 being so positioned as to cut off communication between the heater and a remote point through the pipe 21. In Figure 4, the core of the valve 23 is so positioned as to cut off communication between the water separator and the urn, and establish communication between the water heater and the water separator, in order to draw water on the outside of the urn, the position of the core 31 being in this illustration, like that shown in Figure 3.

The water separator 24, heretofore referred to, comprises an upper section 33, and a lower section 34, the upper section being somewhat larger than the lower, the lower portion being provided with an offset delivery end 35, through which water is delivered. Within the upper section is a smaller tube 36, connected with the valve 23, the lower end of the tube being closed, and provided just above its bottom, with a series of perforations 37, through which water passes into the lower portion of the upper section, the action of the water being in the nature of a projection of the same laterally against the walls of the tube. This water in drawing it off, will be mixed with steam, but by the arrangement shown, the mixture will be such that the water will be so intermingled with the steam as to deliver the water in substantially a solid stream.

An additional support is provided for the water separator in the way of an arm 38 connected with the separator and with the urn.

Connected with the bottom of the water heater, is a steam pipe 39, the connection extending through the bottom of the heater and through a central opening 40 in the serrated disk 13, thus establishing communication between the steam tube in the heater and the pipe 39, which pipe 39 is provided with a T-connection 41, having a valved pipe 42, leading through the bottom of the urn, into the chamber 3, whereby the steam is introduced into the chamber, or to a coil, (not shown), which may be contained in the chamber. In the form shown, the bottom of the chamber 3 is tapped for the reception of a pipe 43 leading through the bottom of the urn and connected with a valved pipe 44, through which steam is exhausted to any convenient point.

Near the end of the pipe 39, it is provided with a T 45, to which is connected a vertical pipe 46, having therein a valve 47, the pipe 46 leading to the gauge tube 48, to the bottom of which is also connected, by a pipe 49, the faucet 50, which faucet is also connected at the back with the beverage chamber 51, the faucet being so arranged that the beverage from the chamber may be turned off through the faucet, and the amount or depth of the beverage in the chamber being indicated by the transparent gauge 48, the communication between the gauge and the chamber being, as before indicated, through the pipe 49.

To the outer end of the pipe 39 is attached by a T-connection 52, a faucet 53, and to the connection 52 is attached a pipe 54 extending into an elbow 55, to which is connected an aspirator 56, there being a valve 57 for controlling the aspirator, and connected with the upper part of the gauge is the pipe 58, having pivoted nozzle 59 within the urn, the purpose of pivoting the nozzle being to raise it out of the way of the strainer, when it is desired to remove the latter, and the purpose of the aspirator is to, under certain conditions, cause a circulation of the beverage through the urn, in order to give to the beverage, the required strength. In order to bring about this circulation, the valve in the pipe 42 is turned so that steam communication between the heater and the urn is cut off, and the steam caused to pass through the pipe 39, to and through the tube 54, through the aspirator into the top of the urn, causing a suction which draws the beverage through the pipe 49, through the gauge, and into the urn above the strainer, the valve 47 of course, being manipulated to permit this communication. The faucet 53 is for the purpose of drawing off the condensed water which may accumulate in the pipe 39.

The top of the urn is of the swinging type, and is provided with oppositely disposed handles 59, the top being supported upon a yoke 60, formed of pipe connections, upon which the cover can be swung to one side.

In operation, steam is admitted through the steam inlet 17, and passes through the steam tube in pipe 39 to the chamber 3 in the urn, the valve in the pipe 42 and the valve in the pipe 44, being so positioned as to permit the circulation of the steam into and out of the urn, under normal conditions. Water is admitted through the water inlet 16, and passes through the serrations 14, in the disk 13, and upwardly between the inner and outer tubes of the heater, circulating meanwhile around the inner tube of the heater until it reaches the top, where its passage is controlled either toward the urn or away from it, as the exigencies of the case may require. When the valve 20 is turned, as shown in Figure 2, water passes to a remote point from the heater, and when in the position shown in Figure 3, it may pass either directly to the urn, or through the water separator, according to the position of the core of the valve 23. When it is desired to circulate the beverage, the valve in the short connection 42 is cut off, so that the steam passes directly through pipe 39 through pipe 54 to the aspirator, causing the suction heretofore mentioned, which draws the contents of the beverage chamber therefrom, causing it to pass upwardly through the gauge into the urn, through the pipe 57, the circulation keeping up as long as the valve in pipe 39 is closed.

Referring to the modification, Figure 5, the numeral 61 designates two electric terminals which are connected with a suitable heating coil contained within the steam pipe 8, thus in this instance furnishing heat by electric resistance instead of by steam, as in the construction shown in the other figures.

While I have described and illustrated the heater in connection with the coffee urn for which it is primarily intended for use, and for which it may be very advantageously used, it will be understood that the heater may be employed in connection with other devices where it may be desired to quickly heat a volume of water, for any of a multitude of uses.

Having thus described my invention, what I claim is:

1. A water heater, comprising a casing having a water chamber at its lower end, heating means within the casing and spaced therefrom, means interposed between the inner wall of the casing and the heating means, whereby water is caused to circulate around the heating means from one end of the casing to the other, a member forming the top of the water chamber and provided with a series of openings adapted to direct the water to the space between the casing and the heating means, through said openings.

2. A water heater comprising a casing, a steam tube within the casing, provided with a series of ribs, with openings between their ends, the openings being alternately arranged so as to cause the water to circulate around the tube in opposite directions, a suitable steam inlet and an outlet, a water chamber at the bottom of the casing, whose top wall forms a closure for the steam tube, the wall also being provided with perforations at its outer edge, whereby water from the chamber is directed from all parts of the chamber to the space between the steam tube and the casing.

3. A water heater comprising an outer casing and spaced heating means, means at the lower part of the heater for directing the flow of water to the heating means, said water directing means comprising a disk having peripheral notches for delivering the water, whereby the water will flow between the casing and the heating means in a thin hollow stream.

4. A water heater comprising an outer casing and spaced heating means, means at the lower part of the heater for directing the flow of water to the heating means, said water directing means comprising a disk having peripheral notches for delivering the water whereby the water will flow between the casing and the heating means in a thin hollow stream, and means to cause the ascending hollow stream of water to circulate around the upper part of the heating means in the space between the latter and the body of the casing.

5. A water heater comprising an outer casing, having an enlarged lower end forming a chamber of greater diameter than the main body of the casing, a heater within the casing and spaced therefrom and having an enlarged proportion extending into said chamber, and spaced from the walls thereof, water directing means within said chamber comprising a disk having peripheral notches for delivering the water whereby the water will flow between the casing and the heating means in a thin hollow stream.

In testimony whereof I affix my signature in presence of two witnesses.

ALPHONSE F. MONEUSE.

Witnesses:
G. H. POETSCHKE,
HERMAN VASILLE.